(12) United States Patent
Lee et al.

(10) Patent No.: US 8,811,979 B2
(45) Date of Patent: Aug. 19, 2014

(54) METHOD FOR PROVIDING PRIVATE INFORMATION TO MOBILE USER AND ASSOCIATED WIRELESS COMMUNICATION NETWORK AND MOBILE STATION

(75) Inventors: Ching-Hao Lee, Taoyuan (TW); Wen-Jui Hsieh, Taoyuan (TW)

(73) Assignee: HTC Corporation (TW)

( * ) Notice: Subject to any disclaimer, the term of this patent is extended or adjusted under 35 U.S.C. 154(b) by 708 days.

(21) Appl. No.: 12/455,965

(22) Filed: Jun. 10, 2009

(65) Prior Publication Data
US 2010/0317340 A1 Dec. 16, 2010

(51) Int. Cl.
*H04W 24/00* (2009.01)
*H04W 68/00* (2009.01)
*H04B 1/38* (2006.01)

(52) U.S. Cl.
USPC ............... 455/426.1; 455/456.1; 455/459; 455/574

(58) Field of Classification Search
USPC .................... 455/456.1, 459, 574
See application file for complete search history.

(56) References Cited

U.S. PATENT DOCUMENTS

| | | | |
|---|---|---|---|
| 6,990,353 B2 * | 1/2006 | Florkey et al. | 455/519 |
| 2002/0169977 A1 * | 11/2002 | Chmaytelli | 713/200 |
| 2008/0207229 A1 * | 8/2008 | Cave et al. | 455/458 |
| 2010/0303033 A1 * | 12/2010 | Shahar et al. | 370/329 |

FOREIGN PATENT DOCUMENTS

| | | |
|---|---|---|
| EP | 1 450 570 | 8/2004 |
| WO | WO 2008/097583 | 8/2008 |

* cited by examiner

*Primary Examiner* — Kent Chang
*Assistant Examiner* — Nelson Rosario (57) ABSTRACT

A method for providing a private information to a mobile user and an associated wireless communication network and mobile station are provided to reduce the consumption of power and radio link bandwidth for transmission of the private information. The method, used in the wireless communication network, comprises paging a mobile station of the mobile user via a paging channel during a paging period to read the private information, and reading the private information by the mobile station via a non-dedicated channel during a reading period after the paging period.

18 Claims, 9 Drawing Sheets

| Name | Status | Preference | Message |
|---|---|---|---|
| Andy | Driving | Voice | No call, thanks. |
| Brian | Sleep | Voice | Sleep, Only Dolly |
| Candy | Free | Video | good food in Taipei 101? |
| Dolly | Meeting | SMS | In USA |
| Emily | Travel | SMS | Sell Wii, 7000. |

METHOD FOR PROVIDING PRIVATE INFORMATION TO MOBILE USER AND ASSOCIATED WIRELESS COMMUNICATION NETWORK AND MOBILE STATION

BACKGROUND OF INVENTION

1. Field of the Invention

The present invention relates to wireless communication networks, and more particularly to a method for providing a private information to a mobile user and an associated wireless communication network and mobile station.

2. Description of the Prior Art

Figure 1A:
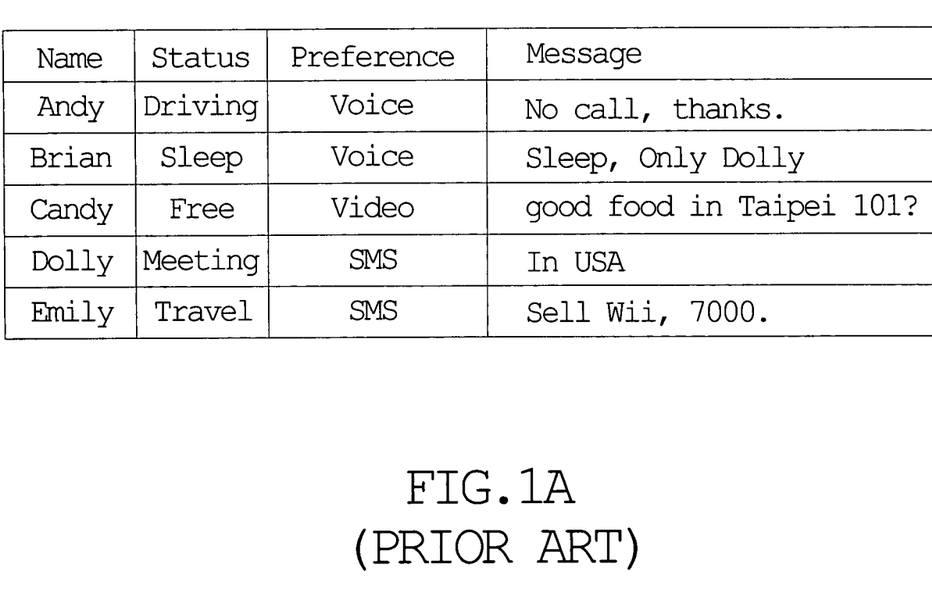
FIG. 1A shows an example of a contact table stored in a user equipment.

In recent years, one kind of mobile network service is developed to real time inform a user equipment or mobile station (e.g. a mobile phone) of a mobile user about his private information, e.g. the updated information of his contacts. The MSN Mobile service is a well-known mobile network service of this kind. FIG. 1A shows an example of a contact table stored in the user equipment, where the name, current status, preferred communication tool (e.g. voice call, video call, SMS, etc.) and short message of each contact are recorded. By reviewing the contact table, the mobile user can obtain real time information about each contact, and prepare well before making a call to his contact.

Figure 1B:
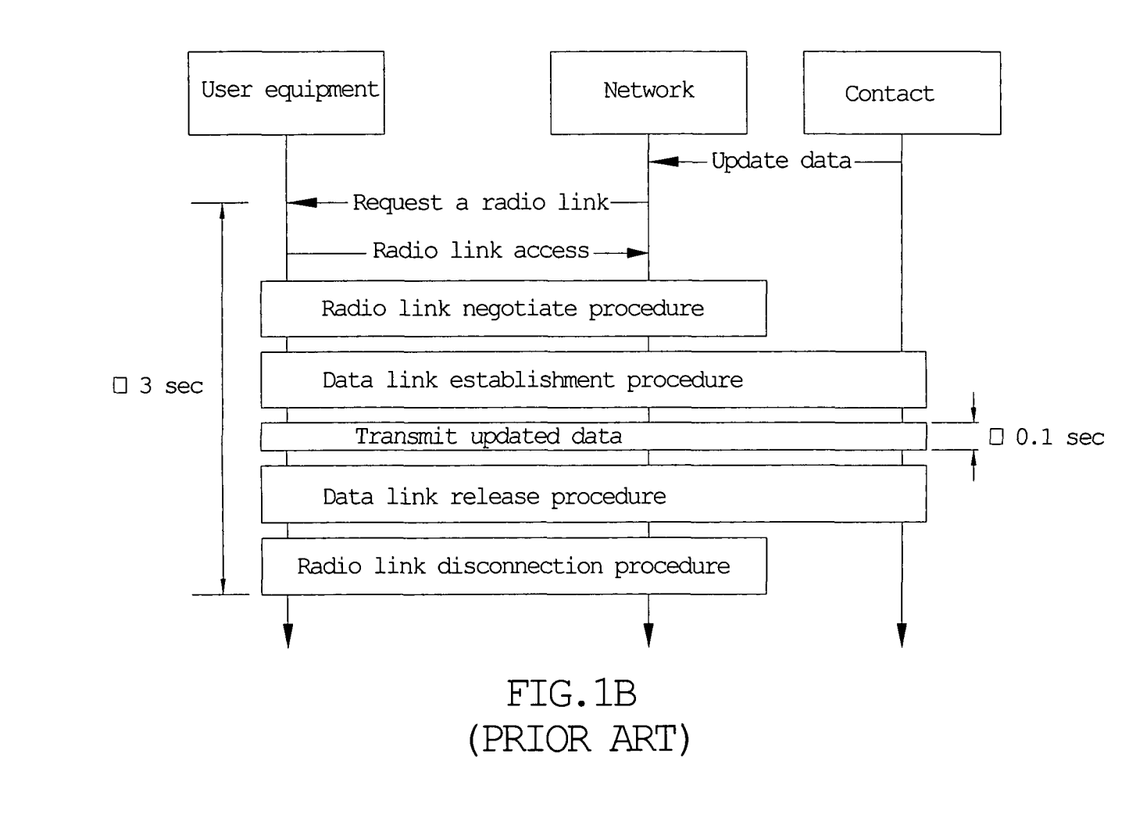
FIG. 1B shows a conventional data transmission process of a dedicated radio link.

In prior arts, when implementing this kind of mobile network service, the mobile network transmits the updated data of the contact table to the user equipment by a dedicated radio link. FIG. 1B shows a conventional data transmission process of the dedicated radio link. As shown in FIG. 1B, when a contact of the user equipment updates his data, the network requests the user equipment to establish a dedicated radio link. The whole process from the start to the end of the dedicated radio link lasts a time period longer than 3, seconds, while the actual time duration for transmitting the updated data may be just shorter than 0.1 seconds. That is, the user equipment consumes large power and radio link bandwidth for transmission and reception of the over-the-air messages when performing various procedures (i.e. radio link negotiation procedure, data link establishment procedure, data link release procedure, radio link disconnection procedure, etc.) that are irrelevant to transmission of the updated data.

Furthermore, the dedicated radio link is established each time when new updated data of the contact table is generated. That is, the times of establishing the dedicated radio link (i.e. the times of updating the contact table) is proportional to the number of contacts in the contact table. Also, each contact may update his data many times in a day. For example, if the contact table contains 50, contacts and each contact updates his data ten times in a day, then the user equipment needs to establish the dedicated radio link 50*10=500, times in a day. This will cause a huge consumption of power and radio link bandwidth, which is very unfavorable to the performance of the user equipment and also the mobile network.

SUMMARY OF INVENTION

It is therefore one objective of the present invention to provide a method for providing a private information to a mobile user and an associated wireless communication network and mobile station, thereby reducing the consumption of power and radio link bandwidth for the transmission of the private information.

In one embodiment of the present invention, a method used in a wireless communication network for providing a private information to a mobile user is provided. The method comprises: paging a mobile station of the mobile user via a paging channel during a paging period to read the private information; and reading the private information by the mobile station via a non-dedicated channel during a reading period after the paging period.

In another embodiment of the present invention, a wireless communication network for providing a private information to a mobile user is provided. The wireless communication network comprises: an application server comprising a database for storing the private information; a mobile station of the mobile user; and a paging module for receiving the private information from the application server, and paging the mobile station via a paging channel during a paging period to read the private information; wherein the mobile station reads the private information from the paging module via a non-dedicated channel during a reading period after the paging period.

In another embodiment of the present invention, a mobile station for receiving a private information of a mobile user from a wireless communication network is provided. The mobile station comprises: a receiving module for receiving a paging message via a paging channel of the wireless communication network during a paging period, wherein the paging message is used to page the mobile station to read the private information; and a reading module for reading the private information via a non-dedicated channel of the wireless communication network during a reading period after the paging period.

DETAILED DESCRIPTION

Figure 2:
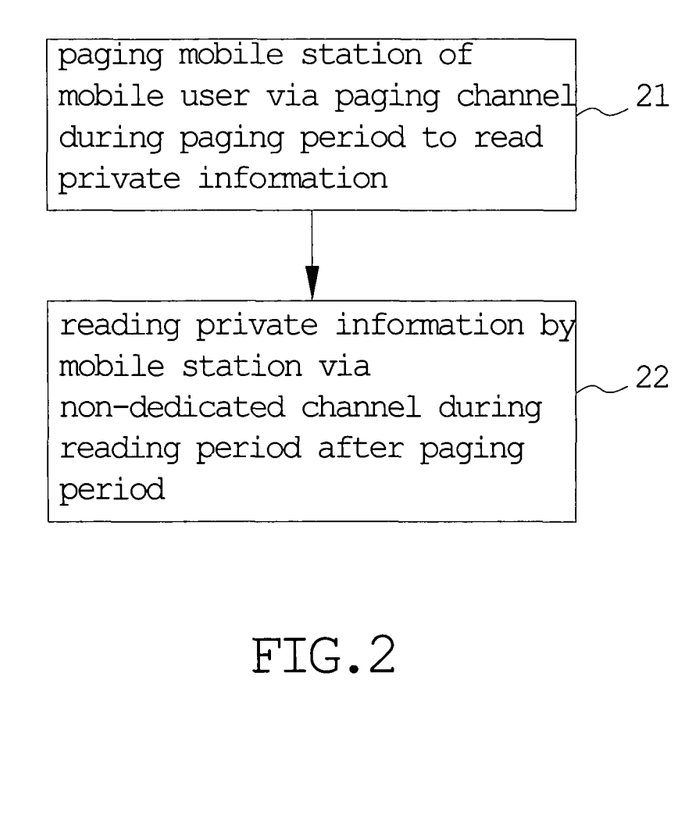
FIG. 2 is a flow chart of a method for providing a private information to a mobile user according to an embodiment of the present invention.

Reference will now to be made in detail to embodiments of the present invention, which are illustrated in the accompanying drawings. FIG. 2 is a flow chart of a method for providing a private information to a mobile user according to an embodiment of the present invention. This method is used in a wireless communication network, and the mobile user utilizes a mobile station to receive the private information from the wireless communication network. The private information, maybe provided as a charged network service or network application, is specific to the mobile user and for personal usage. An example of the private information is the real-time-updated data for a contact table stored in the mobile station of the mobile user. In step 21, the network pages the mobile station of the mobile user via a paging channel during a paging period to read the private information. In a conventional mobile network, when a call is initiated by a source mobile station, paging is used to find the destination mobile station for the call. Typically, the conventional mobile network pages a specific group of mobile stations (e.g. the mobile stations located in the same location area or registration area) by sending a paging message via the paging channel during the paging period to each mobile station within the group, where the paging channel is a shared channel allocated for the purpose of paging, the paging period is a predetermined time slot for the network to perform paging, and the paging message contains a paging cause for informing the mobile station what the current paging is for. For example, in a UMTS (i.e. Universal Mobile Telecommunications System) network, the paging cause may be "Terminating Conversation Call", "Terminating Streaming Call" . . . etc., and each kind of paging cause can be represented by one bit data. When the mobile station receives the paging message, it will determine whether itself is the destination mobile station according to the received paging message. In the embodiment of FIG. 2, however, the conventional way of paging is modified to simultaneously achieve two purposes of finding the destination mobile station for a call and informing a specific mobile station to get its own private information from the network. More specifically, in step 21, when there is a private information to be provided to the mobile user, the network generates a modified paging message different from the conventional paging message mentioned above, where the modified paging message containing a new paging cause "Terminating private information" used for informing the mobile station to read the private information. Then, the network pages the mobile station by sending the modified paging message via the paging channel during the paging period, so as to inform the mobile station to read the private information from the network. It is notable that the modified paging message can still contain the paging cause used for finding the destination mobile station of a call, just as the conventional paging message.

Next, in step 22, the mobile station reads the private information via a non-dedicated channel during a reading period after the paging period, where the non-dedicated channel can be an existing shared channel of the network (i.e. borrowing some radio link bandwidth from the existing channel for transmitting the private information) or a new channel allocated for the purpose of transmitting the private information. Thus, the mobile station establishes a non-dedicated radio link with the network to get the private information. In prior arts, the mobile station needs to establish a dedicated radio link with the network to get the private information. As shown in FIG. 1B, in the whole process of the dedicated radio link, the mobile station performs various procedures and thus continuously consumes huge power and radio link bandwidth in transmitting and receiving over-the-air (OTA) messages. However, in the present invention, in step 22 of FIG. 2, the whole process of maintaining the non-dedicated radio link is much shorter and simpler than the dedicated radio link. Thus, the non-dedicated radio link saves much more power and radio link bandwidth than the dedicated radio link. Since the non-dedicated channel is not dedicated to a specific mobile station by nature, the non-dedicated channel may be shared by plural mobile stations and may not promise a fast, reliable and secure data delivery. Thus, the embodiment of FIG. 2 has best performance for the data traffic with quality of service (QoS) requirements such as small data quantity (maybe just tens of bytes), no need for fast data update, almost only downlink data, or low reliability and security. The update of the contact table of the mobile station is just a good example for applying the above QoS requirements.

Figure 3:
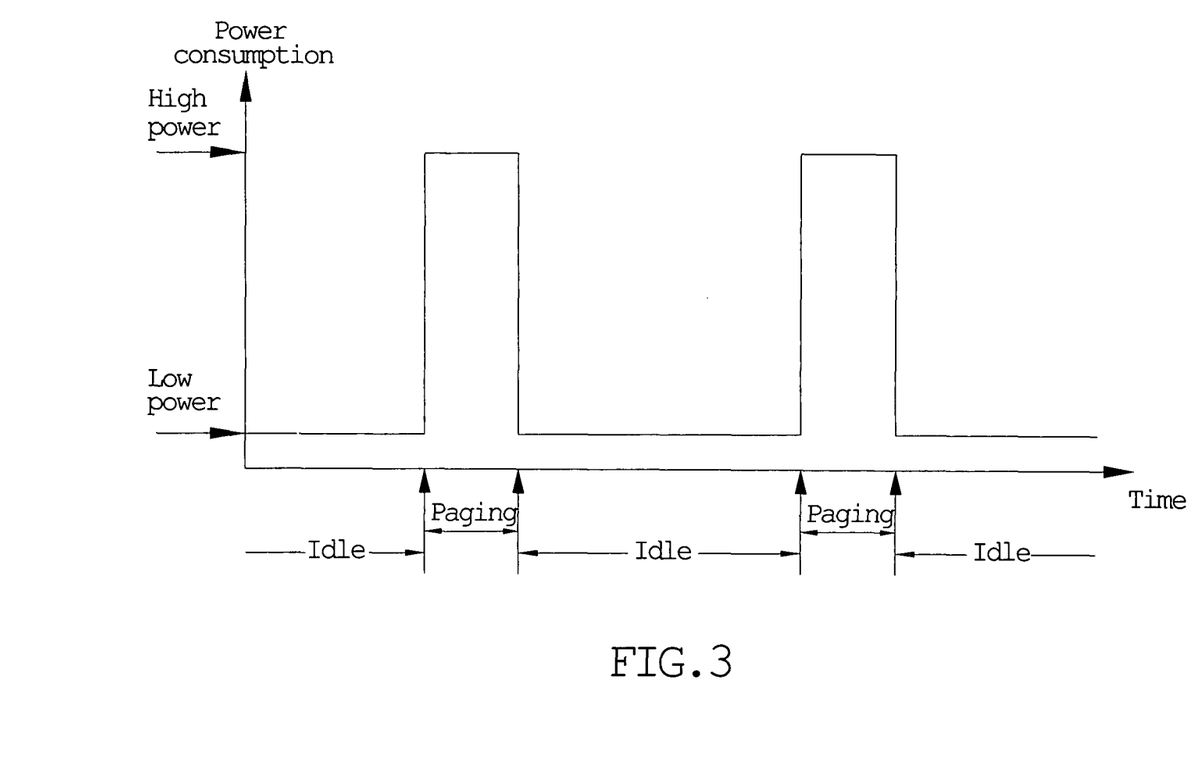
FIG. 3 shows the status of power consumption of a mobile station operating in a DRX mode in prior arts.

In a preferred embodiment, the mobile station of the mobile user is capable of operating in a discontinuous reception (DRX) mode. When operating in the DRX mode, the mobile station can hear the paging message from the network in a discontinuous way as shown in FIG. 3, i.e. during each unit of time (e.g. one second), the mobile station just wakes up from an idle state (consuming a low power) for a short period of time (e.g. 100 milli-second), so as to hear if the network pages it. This short period of time is called a paging DRX cycle. During the paging DRX cycle, the mobile station turns on RF and baseband power, and thus costs a high power as shown in FIG. 3. In this preferred embodiment, in step 21, the paging period during which the network pages the mobile station to read the private information is then a paging DRX cycle.

Figure 4:
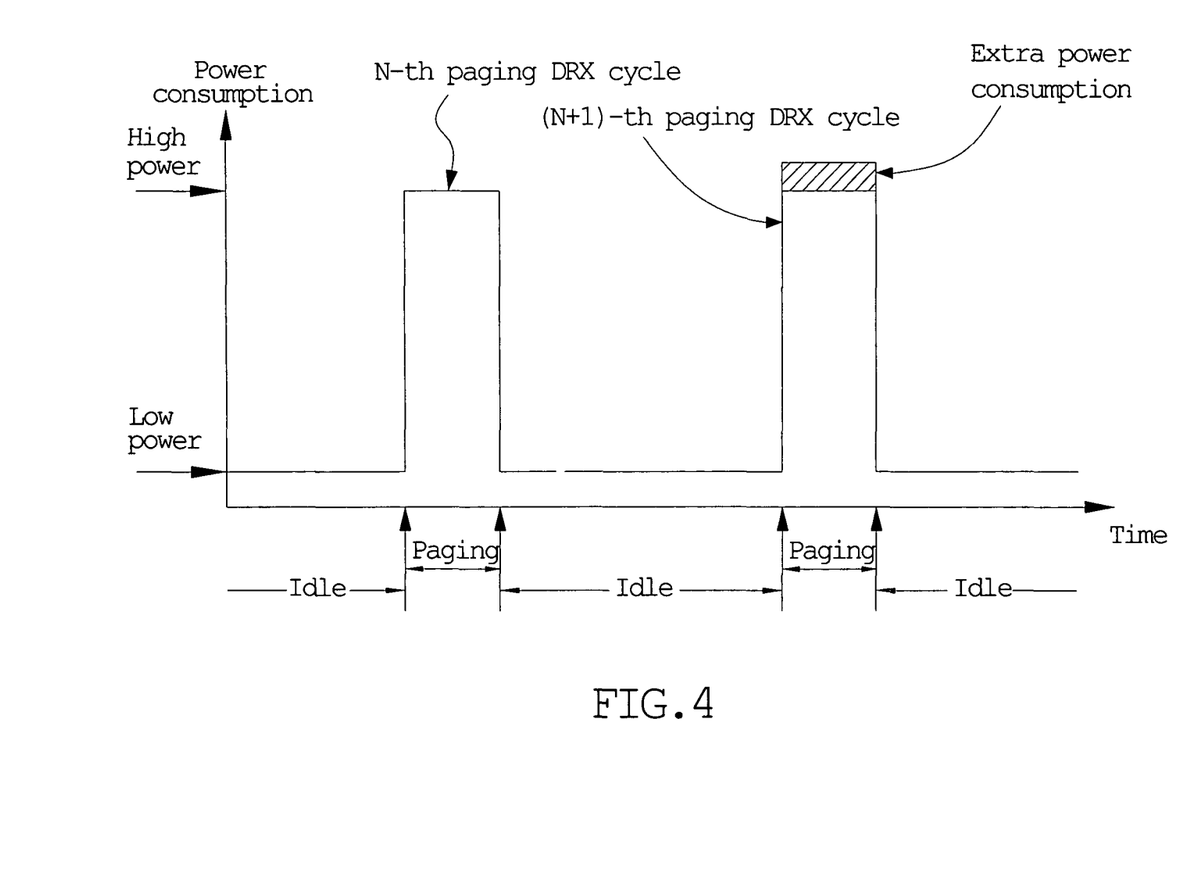
FIG. 4 shows the status of power consumption of a mobile station operating in a DRX mode according to an embodiment of the present invention.

In step 22 of this preferred embodiment, as shown in FIG. 4, the reading period for the mobile station to read the private information can be a next paging DRX cycle (i.e. the (N+1)-th paging DRX cycle) after the paging DRX cycle for the network to page the mobile station to read the private information (i.e. the N-th paging DRX cycle). Since the mobile station has already waken up during the (N+1)-th paging DRX cycle, the mobile station can directly read the private information via the non-dedicated channel with only few extra power consumption in reading and processing the private information, as shown in FIG. 4. It is notable that the reading period can also be another paging DRX cycle, rather than the (N+1)-th paging DRX cycle, after the N-th paging DRX cycle.

Basically, the paging channel is not used as the non-dedicated channel for reading the private information. But, if the data quantity of the private information is quite small, then the private information can be embedded in a paging message, and the mobile station can get the private information by receiving this paging message via the paging channel, that is, the non-dedicated channel for reading the private information is just the paging channel in this situation.

Figure 5:
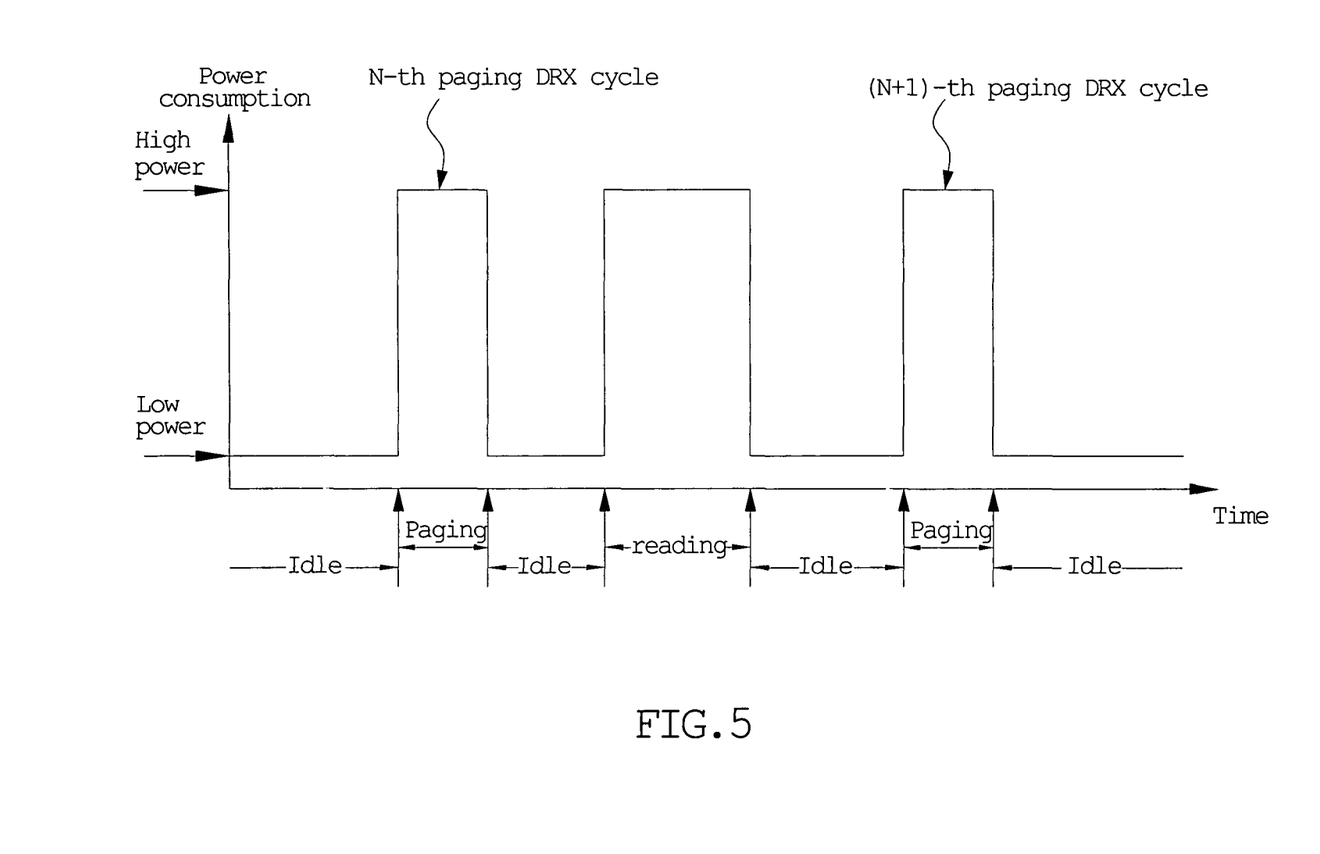
FIG. 5 shows the status of power consumption of a mobile station operating in a DRX mode according to another embodiment of the present invention.

In the preferred embodiment, the reading period for reading the private information can also be other predetermined time period (rather than any subsequent paging DRX cycle) after the N-th paging DRX cycle, as shown in FIG. 5. In this case, the mobile station needs to wake up from the idle mode one more time (rather than utilizes the existing wake-up state during a subsequent paging DRX cycle) and occupies the downlink radio link bandwidth of the non-dedicated channel during the reading period. Even so, the consumption of power and radio link bandwidth is still less than the case of reading the private information via the dedicated channel. When the data quantity of the private information is not quite small such that the mobile station cannot read all the private information during a single paging DRX cycle, this case is more suitable for implementation. In addition, if there are plural mobile stations paged to read their own private information during the N-th paging DRX cycle, the reading period for each mobile station or each sub-group of the plural mobile stations can be synchronized according to the N-th paging DRX cycle, so as to separate the reading periods for different mobile stations or different sub-groups of mobile stations. For instance, 0~100, milli-seconds after the N-th paging DRX cycle can be defined as the reading period of the first mobile station, 101~200, milli-seconds after the N-th paging DRX cycle can be defined as the reading period of the second mobile station . . . and so on. In this manner, the congestion of the non-dedicated channel can be avoided, and thus the efficiency of providing the private information can be upgraded.

Figure 6:
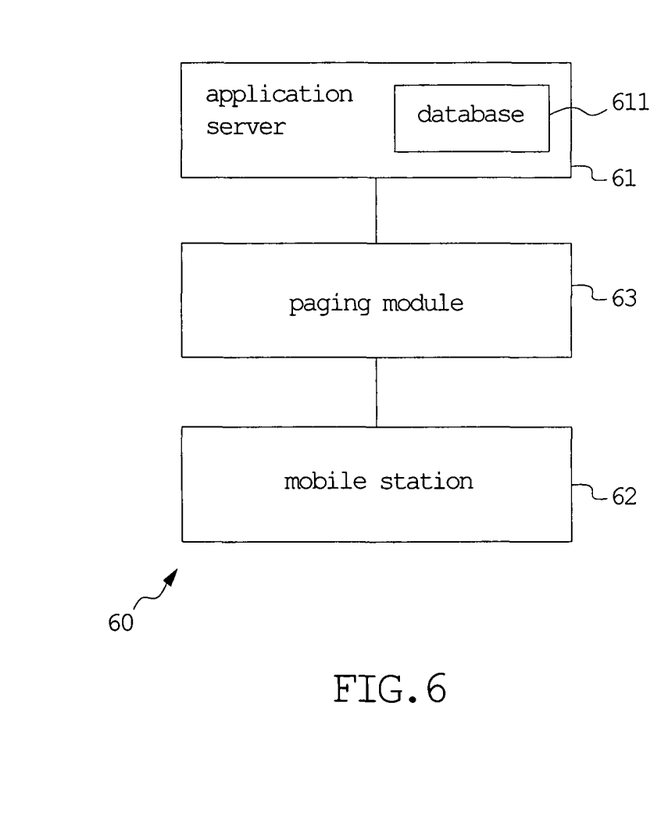
FIG. 6 shows a block diagram of an embodiment of the wireless communication network implementing the method of FIG. 2.

FIG. 6 shows a block diagram of an embodiment of the wireless communication network implementing the method of FIG. 2. As shown in FIG. 6, the wireless communication network 60 comprises an application server 61, a mobile station 62 and a paging module 63. The application server 61 comprises a database 611 for storing the private information of the mobile user. The mobile station 62 is used by the mobile user to get his private information. The paging module 63 receives from the application server 61 the private information to be provided to the mobile station 62, and pages the mobile station 62 via the paging channel during the paging period to read the private information. After being paged, the mobile station 62 reads the private information from the paging module 63 via the non-dedicated channel during the reading period after the paging period.

If the mobile station 62 is capable of operating in the DRX mode, then when the mobile station 62 operates in the DRX mode, the paging period is a paging DRX cycle and the reading period is another paging DRX cycle (e.g. a next paging DRX cycle) after the paging DRX cycle. When the data quantity of the private information is small, the non-dedicated channel can be the paging channel. In this case, the mobile station 62 receives a paging message embedded with the private information from the paging module 63 via the paging channel during the another paging DRX cycle mentioned above.

Figure 7:
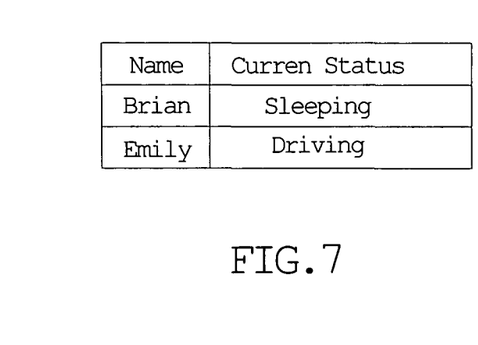
FIG. 7 shows an example of the contact table stored in both the database and the mobile station of FIG. 6.

In a preferred embodiment of the wireless communication network 60, each of the database 611 and the mobile station 62 stores a contact table of the mobile user, and the contact table stores related data of each contact of the mobile user. When the related data of any contact stored in the contact table of the database 611 is changed, the application server 61 generates the private information comprising an update of the related data of the contact. After reading the private information, the mobile station 62 will update its contact table according to the update of the related data of the contact. FIG. 7 shows an example of the contact table stored in both the database 611 and the mobile station 62, where two contacts Brian and Emily are shown. In FIG. 7, the related data of each contact comprises an identifier (the name in this case) and a current status of the contact. By knowing the current status of the contact, the mobile user determines whether to call the contact at this time point. For example, if the current status of the contact is "sleeping", then it may not be proper to call the contact at the present. It should be noted that the contact table shown in FIG. 7 is just an example, and other kinds of contact tables can also be applied to the present invention as long as they stores the related data of the contacts.

In addition to the private information to be provided, the paging module 63 further receives an identity of the mobile station from the application server 61. The paging module 63 can then page the mobile station 62 according to the received identity. The identity of the mobile station 62 can be an International Mobile Subscriber Identity (IMSI).

The paging module 63 further receives from the application server 61 a corresponding value tag of the private information for indicating how recent the private information is. This value tag can be used to determine if the mobile station 62 loses any private information. For example, the value tag can be configured as increased by one each time when a new private information is generated. Then, when the mobile station 62 reads a private information, it compares the corresponding value tag of the current private information with that of the last-read private information, so as to determine if any private information is lost. If the value tag of the current private information is 10 while that of the last-read private information is 9, then no private information is lost; if the value tag of the current private information is 10 while that of the last-read private information is 7, then the private informations with the corresponding value tags 8 and 9 are lost. In this case, the mobile station can make a request to the paging module 62 to re-send the lost private informations.

Figure 8:
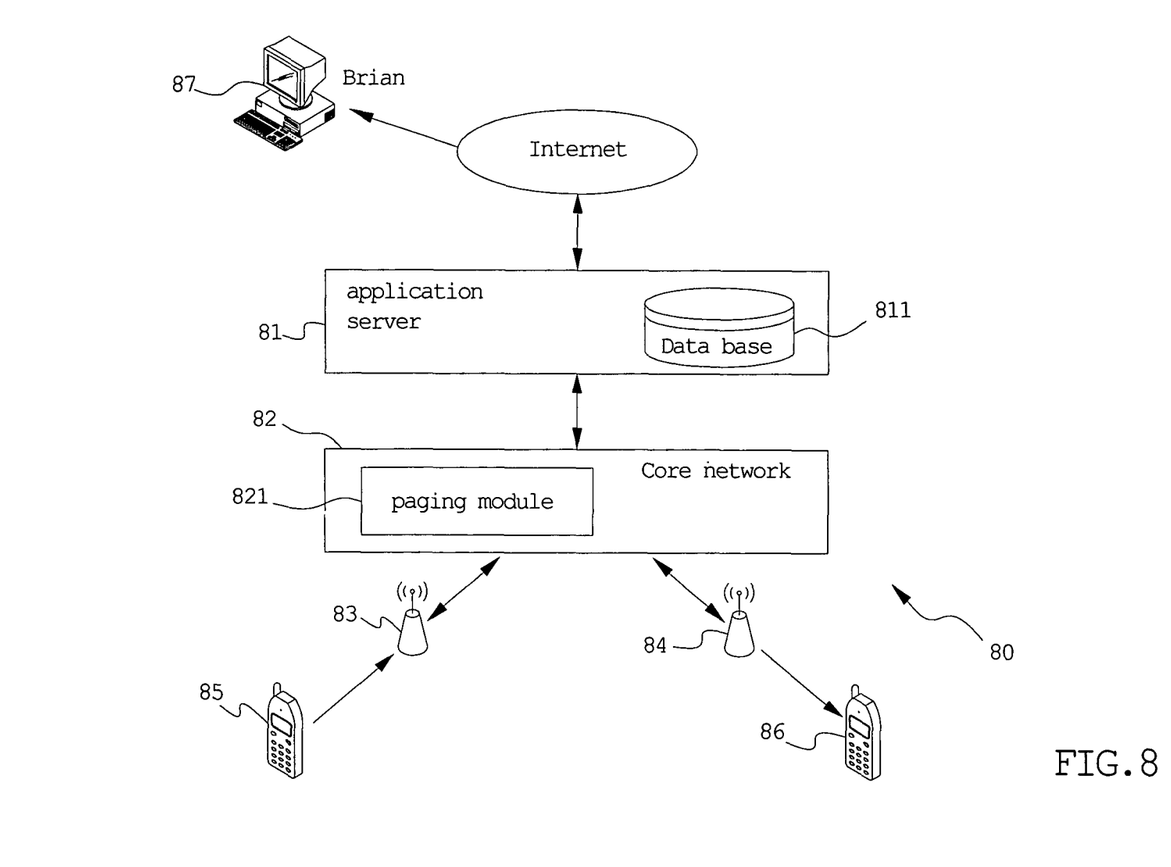
FIG. 8 shows an architectural diagram of another embodiment of the wireless communication network implementing the method of FIG. 2.

FIG. 8 shows an architectural diagram of another embodiment of the wireless communication network implementing the method of FIG. 2. In this embodiment, the wireless communication network 80 can perform a network service of providing the private information to a mobile station for real time updating the contact table stored therein. The wireless communication network 80 comprises an application server 81, a core network 82, two base stations 83 and 84, and two mobile stations 85 and 86 (shown as mobile phones in FIG. 8). The application server 81 includes a database 811 for storing a corresponding contact table for each mobile user who registers for the network service. The format of the contact table can be designed as, while not limited to, FIG. 1A or FIG. 7. The core network 82 includes a paging module 821. The mobile station 85, belonging to the mobile user Candy, can communicate with the core network 82 via the base station 83; the mobile station 86, belonging to the mobile user Emily, can communicate with the core network 82 via the base station 84. Since both Candy and Emily have registered for the network service, the database 811 also stores the contact tables of Candy and Emily. When the mobile station 85 (or 86) is powered on, it downloads the current contact table of Candy (or Emily) from the database 811. Thus, the mobile stations 85 and 86 respectively store the contact tables of Candy and Emily.

If Candy is a contact within the contact table of Emily, then when Candy uses the mobile station 85 to inform the application server 811 via the base station 83 and the core network 82 that her current status or other related data is changed, the application server 81 updates the contact table of Emily stored in the database 811, and then transfers a private information (including the updated data of Candy), a corresponding value tag, and an identity (e.g. IMSI) of Emily to the paging module 821, which then pages the mobile station 86 of Emily to get the private information. After being paged, the mobile station 86 reads the private information from the paging module 821. The way in which the paging module 821 pages the mobile station 86 and the mobile station 86 reads the private information is similar to the paging module 63 and the mobile station 62, and thus will not be described again here.

It is notable that the network service provided by the wireless communication network 80 can be extended to an Internet user as Brian, who can use an Internet access tool 87 (shown as a PC in FIG. 8) to connect to the network 80 via the Internet. If Brian registers to the application server 81 through the Internet, the database 811 will store a contact table of Brian. If Candy is also a contact within the contact table of Brian, then when Candy updates her related data, the application server 81 updates the contact table of Brian stored in the database 811, and then informs Brian of the updated data via the Internet. It is also notable that the application server 81 may be located within, rather than outside, the core network 82.

Figure 9:
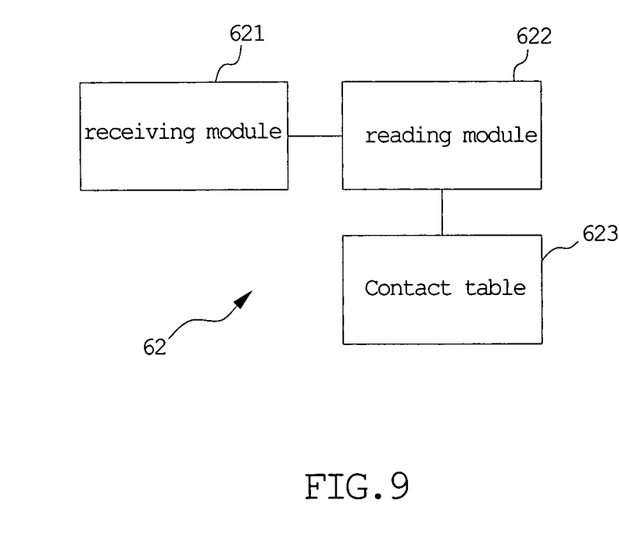
FIG. 9 shows a block diagram of an embodiment of the mobile station 62 in FIG. 6 according to the present invention.

FIG. 9 shows a block diagram of an embodiment of the mobile station 62 in FIG. 6 according to the present invention. As shown in FIG. 9, the mobile station 62 comprises a receiving module 621, a reading module 622 and a contact table 623. The receiving module 621 is for receiving a paging message 60 via the paging channel of the wireless communication network 60 during the paging period, where the paging message is used to page the mobile station 62 to read a private information. The reading module 622 is for reading the private information via the non-dedicated channel of the wireless communication network 60 during the reading period after the paging period. The contact table 623 has a format similar to FIG. 7, and is used for storing related data of each contact of the mobile user. The private information read by the reading module 622 comprises an update of the related data, and is used by the reading module 622 to update the contact table 623. In this embodiment, each of the receiving module 621 and the reading module 622 can be a software module executed by the mobile station 62.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A method used in a wireless communication network for providing a private information to a mobile user, the method comprising: paging a mobile station of the mobile user via a paging channel during a paging period to read the private information; and reading the private information by the mobile station via a non-dedicated channel during a reading period after the paging period, wherein the non-dedicated channel is a new channel allocated for transmitting the private information, and whereby the use of the non-dedicated channel saves power and reduces bandwidth; wherein the non-dedicated channel is the paging channel; wherein the private information is specific to the mobile user and for personal usage; wherein the private information is embedded in a paging message which is sent to the mobile station via the paging channel during the second paging DRX cycle; wherein, when there is a private information to be provided to the mobile user, the wireless communication network generates a modified paging message, where the modified paging message containing a new paging cause "Terminating private information" used for informing the mobile station to read the private information; and then, the wireless communication network pages the mobile station by sending the modified paging message via the paging channel during the paging period, so as to inform the mobile station to read the private information from the wireless communication network; and wherein the mobile station operates in a discontinuous reception (DRX) mode, the paging period is a paging DRX cycle; the reading period is another paging DRX cycle after the paging DRX cycle.

2. The method of claim 1, wherein the reading period is a next paging DRX cycle after the paging DRX cycle.

3. The method of claim 1, wherein the reading period is synchronized according to the paging period.

4. The method of claim 1, wherein the mobile station comprises a contact table for storing related data of at least one contact of the mobile user, wherein the private information comprises an update of the related data of the contact;
wherein, the wireless communication network comprises an application server and a paging module for receiving from the application server a corresponding value tag of the private information for indicating how recent the private information is; the value tag is used to determine if the mobile station loses any private information.

5. The method of claim 4, wherein the related data of the contact comprises at least an identifier and a current status of the contact;
wherein, the value tag is configured as increased by one each time when a new private information is generated; and then, when the mobile station reads a private information, the mobile station compares the corresponding value tag of the current private information with that of the last-read private information, so as to determine if any private information is lost; if the value tag of the current private information is N while that of the last-read private information is N-1, then no private information is lost;
if the value tag of the current private information is N while that of the last-read private information is N-D, then the private informations with the corresponding value tags between N-D and N are lost; in this case, the mobile station makes a request to the paging module to re-send the lost private informations; wherein, N is an integral larger than 1, and D is another integral larger than 1, but small than N.

6. A wireless communication network for providing a private information to a mobile station of a mobile user comprising: an application server comprising a database for storing the private information; and a paging module for receiving the private information from the application server, and paging the mobile station via a paging channel during a paging period to read the private information; wherein the mobile station reads the private information from the paging module via a non-dedicated channel during a reading period after the paging period, wherein the non-dedicated channel is a new channel allocated for transmitting the private information, and whereby the use of the non-dedicated channel saves power and reduces bandwidth; wherein the non-dedicated channel is the paging channel wherein the private information is specific to the mobile user and for personal usage; wherein the private information is embedded in a paging message which is sent to the mobile station via the paging channel during the second paging DRX cycle; wherein, when there is a private information to be provided to the mobile user, the wireless communication network generates a modified paging message, where the modified paging message containing a new paging cause "Terminating private information" used for informing the mobile station to read the private information; and then, the wireless communication network pages the mobile station by sending the modified paging message via the paging channel during the paging period, so as to inform the mobile station to read the private information from the wireless communication network; and wherein the mobile station operates in a discontinuous reception (DRX) mode, the paging period is a paging DRX cycle; the reading period is another paging DRX cycle after the paging DRX cycle.

7. The wireless communication network of claim 6, wherein the non-dedicated channel is the paging channel.

8. The wireless communication network of claim 6, wherein the paging module pages the mobile station by sending a paging message via the paging channel during the paging period to the mobile station, wherein the paging message comprises a paging cause for informing the mobile station to read the private information.

9. The wireless communication network of claim 6, wherein each of the database and the mobile station stores a contact table of the mobile user, and the contact table stores related data of at least one contact of the mobile user, wherein when the related data stored in the contact table of the database is changed, the application server generates the private information comprising an update of the related data which is used to update the contact table of the mobile station.

10. The wireless communication network of claim 9, wherein the related data of the contact comprises at least an identifier and a current status of the contact.

11. The wireless communication network of claim 6, wherein the paging module further receives a corresponding value tag of the private information from the application server, wherein the corresponding value tag indicates how recent the private information is; the value tag is used to determine if the mobile station loses any private information; the value tag is configured as increased by one each time when a new private information is generated; and then, when the mobile station reads a private information, the mobile station compares the corresponding value tag of the current private information with that of the last-read private information, so as to determine if any private information is lost; if the value tag of the current private information is N while that of the last-read private information is N-1, then no private information is lost; if the value taq of the current private information is N while that of the last-read private information is N-D, then the private informations with the corresponding value tags between N-D and N are lost; in this case, the mobile station makes a request to the paging module to re-send the lost private informations; wherein, N is an integral larger than 1, and D is another integral larger than 1, but small than N.

12. The wireless communication network of claim 6, wherein the paging module further receives an identity of the mobile station from the application server, wherein the paging module pages the mobile station according to the received identity.

13. In a wireless communication network, a mobile station for receiving a private information of a mobile user comprising: a receiving module for receiving a paging message via a paging channel of the wireless communication network during a paging period, wherein the paging message is used to page the mobile station to read the private information; and a reading module for reading the private information via a non-dedicated channel of the wireless communication network during a reading period after the paging period, wherein the non-dedicated channel is a new channel allocated for transmitting the private information, and whereby the use of the non-dedicated channel saves power and reduces bandwidth; wherein the non-dedicated channel is the paging channel; wherein the private information is specific to the mobile user and for personal usage; wherein the private information is embedded in a paging message which is sent to the mobile station via the paging channel during the second paging DRX cycle; wherein, when there is a private information to be provided to the mobile user, the wireless communication network generates a modified paging message, where the modified paging message containing a new paging cause "Terminating private information" used for informing the mobile station to read the private information; and then, the wireless communication network pages the mobile station by sending the modified paging message via the paging channel during the paging period, so as to inform the mobile station to read the private information from the wireless communication network; and wherein the mobile station operates in a discontinuous reception (DRX) mode, the paging period is a paging DRX cycle; the reading period is another paging DRX cycle after the paging DRX cycle.

14. The mobile station of claim 13, wherein the non-dedicated channel is the paging channel; wherein, when there is a private information to be provided to the mobile user, the wireless communication network generates a modified paging message, where the modified paging message containing a new paging cause "Terminating private information" used for informing the mobile station to read the private information; and then, the wireless communication network pages the mobile station by sending the modified paging message via the paging channel during the paging period, so as to inform the mobile station to read the private information from the wireless communication network.

15. The mobile station of claim 13, wherein the reading period is synchronized according to the paging period.

16. The mobile station of claim 13, further comprising: a contact table for storing related data of at least one contact of the mobile user, wherein the private information comprises an update of the related data of the contact.

17. The mobile station of claim 16, wherein the related data of the contact comprises at least an identifier and a current status of the contact;
wherein, the wireless communication network comprises an application server and a paging module for receiving from the application server a corresponding value tag of the private information for indicating how recent the private information is; the value tag is used to determine if the mobile station loses any private information;
wherein, the value tag is configured as increased by one each time when a new private information is generated; and then, when the mobile station reads a private information, the mobile station compares the corresponding value tag of the current private information with that of the last-read private information, so as to determine if any private information is lost; if the value tag of the current private information is N while that of the last-read private information is N-1, then no private information is lost;
if the value tag of the current private information is N while that of the last-read private information is N-D, then the private informations with the corresponding value tags between N-D and N are lost; in this case, the mobile station makes a request to the paging module to re-send the lost private informations; wherein, N is an integral larger than 1, and D is another integral larger than 1, but small than N.

18. A method used in a wireless communication network for providing a private information to a mobile user, the method comprising: paging a mobile station of the mobile user via a paging channel during a paging period to read the private information; and reading the private information by the mobile station via a non-dedicated channel during a reading period after the paging period, wherein the non-dedicated channel is the paging channel; wherein the private information is specific to the mobile user and for personal usage; wherein the private information is embedded in a paging message which is sent to the mobile station via the paging channel during the second paging DRX cycle; wherein, when there is a private information to be provided to the mobile user, the wireless communication network generates a modified paging message, where the modified paging message containing a new paging cause "Terminating private information" used for informing the mobile station to read the private information; and then, the wireless communication network pages the mobile station by sending the modified paging message via the paging channel during the paging period, so as to inform the mobile station to read the private information from the wireless communication network; and wherein the mobile station operates in a discontinuous reception (DRX) mode, the paring period is a paging DRX cycle; the reading period is another paging DRX cycle after the paging DRX cycle.

* * * * *